United States Patent [19]
Joung et al.

[11] Patent Number: 5,555,097
[45] Date of Patent: Sep. 10, 1996

[54] TELEVISION-INTEGRATED VIDEO CASSETTE RECORDER APPARATUS

[75] Inventors: Mun C. Joung; Young J. Choi; Kwan B. Shim; Do H. Cho; Seung I. Kim; Byoung K. Yoo, all of Seoul, Rep. of Korea

[73] Assignee: Goldstar Co., Ltd., Seoul, Rep. of Korea

[21] Appl. No.: 241,556

[22] Filed: May 12, 1994

[30] Foreign Application Priority Data

May 18, 1993 [KR] Rep. of Korea .................. 93-8493

[51] Int. Cl.⁶ .................................................. H04N 5/926
[52] U.S. Cl. .................... 358/335; 348/441; 348/445; 348/581
[58] Field of Search ............................ 358/335; 348/441, 348/445, 581

[56] References Cited

U.S. PATENT DOCUMENTS

| | | | |
|---|---|---|---|
| 4,845,564 | 7/1989 | Hakamada et al. | 348/565 |
| 5,428,454 | 6/1995 | Kimura | 358/335 |
| 5,469,272 | 11/1995 | Kubota | 358/335 |

FOREIGN PATENT DOCUMENTS

| | | |
|---|---|---|
| 0400745 | 12/1990 | European Pat. Off. . |
| 0546858 | 11/1992 | European Pat. Off. . |
| 0524715 | 1/1993 | European Pat. Off. . |
| 9209170 | 5/1992 | WIPO . |

OTHER PUBLICATIONS

Lee et al.; "A Study on New DCT–Based Bit Rate Reduction Algorithm and Variable Speed Playback for a Home Use Digital VCR"; Jun. 5, 1992; pp. 236–241.

Patent Abstract of Japan; JP-A-04 091 584; vol. 16, No. 318; Jul. 13, 1992; (Matsushita Electric Industrial).

Patent Abstract of Japan; JP-A-03 136 494; vol. 15, No. 355; Sep. 9, 1991; (Toshiba).

Patent Abstract of Japan; JP-A-01 062 987; vol. 13, No. 272; Jun. 22, 1989; (Matsushita Electric Industrial).

*Primary Examiner*—Howard W. Britton

[57] ABSTRACT

A television-integrated video cassette recorder apparatus comprising a high definition television for receiving a high definition television signal from a broadcasting station, a digital video cassette recorder for recording and playing back the high definition television signal or a standard television signal on/from a magnetic tape, and an interface circuit for converting a format of the high definition television signal into a recording format of the digital video cassette recorder in a recording mode, converting a format of a playback signal from the digital video cassette recorder into a high definition television format or a standard television format in a playback mode and performing a plurality of screen processing functions in a standard television manner. According to the present invention, a compatibility is provided between a standard TV system and a HDTV system.

21 Claims, 13 Drawing Sheets

TELEVISION-INTEGRATED VIDEO CASSETTE RECORDER APPARATUS

BACKGROUND OF THE INVENTION

1. Field of the Invention

The present invention relates in general to a television (referred to hereinafter as TV)-integrated video cassette recorder (referred to hereinafter as VCR) apparatus, and more particularly to a TV-integrated digital VCR apparatus in which a digital VCR is interfaced with a high definition television (referred to hereinafter as HDTV) or a standard TV to record and play back data of a HDTV format or of a standard TV format.

2. Description of the Prior Art

A standard TV system such as, for example, an NTSC system has generally been used till now, while a HDTV system has recently been developed and will be commercially available in the near future. Although the HDTV system will be commercially available, it is anticipated that the standard TV system will coexist with the HDTV system for a long time.

On the other hand, compatibility is required between the standard TV system and the HDTV system in the case where a digital VCR intends to record an NTSC broadcasting signal as well as a HDTV broadcasting signal, to convert the HDTV broadcasting signal into the NTSC broadcasting signal for playback or to convert the NTSC broadcasting signal into the HDTV broadcasting signal for the playback.

For example, trick playback modes of the NTSC system such as edit & dubbing, a high-speed playback and etc. are difficult to perform with a HDTV broadcasting signal format. For this reason, there is a necessity for efficiently applying the trick playback modes of the NTSC system to the HDTV system. Also, recording modes of the NTSC system such as a standard play (SP), a long play (LP) and etc. must readily be applied to the HDTV system.

SUMMARY OF THE INVENTION

Therefore, the present invention has been made in view of the above problems, and it is an object of the present invention to provide a TV-integrated VCR apparatus which is capable of recording and playing back both a HDTV broadcasting signal and a standard TV broadcasting signal to provide compatibility between a standard TV system and a HDTV system.

In accordance with the present invention, the above and other objects can be accomplished by a provision of a television-integrated video cassette recorder apparatus comprising a high definition television for receiving a high definition television signal from a broadcasting station; a digital video cassette recorder for recording and playing back the high definition television signal or a standard television signal on/from a magnetic tape; and interface means for converting a format of the high definition television signal into a recording format of said digital video cassette recorder in a recording mode, converting a format of a playback signal from said digital video cassette recorder into a high definition television format or a standard television format in a playback mode and performing a plurality of screen processing functions in a standard television manner. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
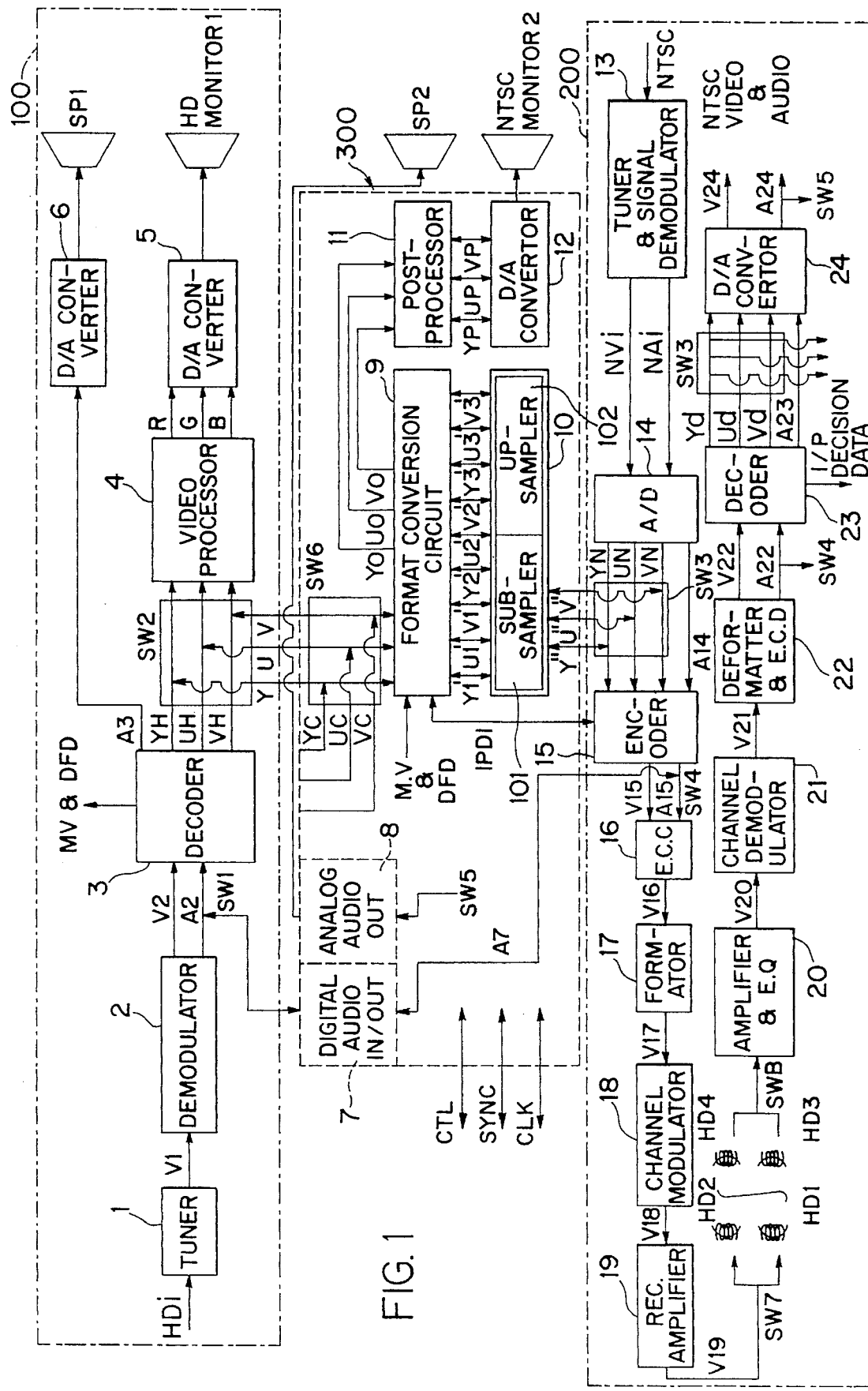
FIG. 1 is a block diagram of a TV-integrated VCR apparatus in accordance with the embodiments of the present invention.

Referring to FIG. 1, there is shown a block diagram of a TV-integrated VCR apparatus in accordance with the embodiments of the present invention. As shown in this drawing, the TV-integrated VCR apparatus comprises a HDTV 100 for receiving a HDTV signal HDi from a broadcasting station, a digital VCR 200 for recording and playing back the HDTV signal or a standard TV signal on/from a magnetic tape, and an interface circuit 300 for converting a format of the HDTV signal into a recording format of the digital VCR 200 in a recording mode, converting a format of a playback signal from the digital VCR 200 into a HDTV format or a standard TV format in a playback mode and performing various screen processing functions in a standard TV manner.

The HDTV 100 includes a tuner 1 for tuning the HDTV signal HDi from the broadcasting station, a demodulator 2 for demodulating an output V1 from the tuner 1, correcting a mixed error component of the demodulated signal and separating a video signal V2 and an audio signal A2 from the error-corrected signal, a decoder 3 for decoding the video signal V2 and the audio signal A2 from the demodulator 2 to expand them into original states and detecting a motion vector M.V and a displaced frame or field difference signal DFD from the video signal V2, a video processor 4 for receiving video outputs YH, UH and VH from the decoder 3 through a switch SW2 and restoring the received signals into color signals R, G and B, a digital/analog (D/A) converter 5 for converting the color signals R, G and B from the video processor 4 into an analog video signal and outputting the converted analog video signal to a high definition monitor Monitor 1, and a D/A converter 6 for converting an audio output A3 from the decoder 3 into an analog audio signal and outputting the analog audio signal to a speaker SP1.

The interface circuit 300 includes a format conversion circuit 9 for converting a format of video data from the HDTV 100 or the digital VCR 200 into a desired format, a sampling circuit 10 for sub-sampling video outputs Y1', U1' and V1', Y2', U2' and V2' and Y3', U3' and V3' from the format conversion circuit 9 to reduce a data amount thereof, outputting the sampled signals to the digital VCR 200, up-sampling video outputs Y", U" and V" from the digital VCR 200 to increase a data amount thereof and outputting the sampled signals to the format conversion circuit 9, a post-processor 11 for processing video outputs Yo, Uo and Vo from the format conversion circuit 9 to perform the various screen processing functions such as a picture-in-picture (PIP) function, a zooming function, an edit function and etc., a D/A converter 12 for converting video outputs YP, UP and VP from the post-processor 11 into an analog video signal and outputting the analog video signal to a standard TV monitor Monitor 2, an analog audio output unit 8 for inputting an analog audio signal from the digital VCR 200 through a switch SW5 and outputting the inputted analog audio signal to a speaker SP2, and a digital audio input/output unit 7 for inputting and outputting digital audio signals from/to the HDTV 100 and the digital VCR 200 through switches SW1 and SW4.

The digital VCR 200 is provided with two parts, recording and playback parts. The recording part of the digital VCR 200 includes a tuner/demodulator circuit 13 for tuning the standard TV signal NTSC from the broadcasting station and demodulating the tuned signal, an analog/digital (A/D) converter 14 for converting video and audio outputs NVi and NAi from the tuner/demodulator circuit 13 into digital signals, an encoder 15 for receiving video outputs YN, UN and VN and an audio output A14 from the A/D converter 14 or video outputs Y", U" and V" from the sampling circuit 10 in the interface circuit 300 through a switch SW3 and encoding the received signals, an error correction coder (ECC) 16 for correcting error components of video and audio outputs V15 and A15 from the encoder 15, a formatter 17 for converting a format of an output V16 from the error correction coder 16 into the recording format, a channel modulator 18 for modulating an output V17 from the formatter 17 suitably to a channel characteristic, and a recording amplifier 19 for amplifying an output V18 from the channel modulator 18 by a predetermined level and recording the amplified signal on the magnetic tape through heads HD1 and HD2.

The playback part of the digital VCR 200 includes a playback amplifier/equalizer circuit 20 for amplifying a signal detected by heads HD3 and HD4 by a predetermined level and compensating for a distortion of the amplified signal, a channel demodulator 21 for demodulating an output V20 from the amplifier/equalizer circuit 20, a deformatter/error correction decoder (ECD) circuit 22 for convening a format of an output V21 from the channel demodulator 21 into an original format and correcting an error component of the converted signal, and a decoder 23 for decoding video and audio outputs V22 and A22 from the deformatter/error correction decoder circuit 22 into original signals Yd, Ud, Vd and A23 and outputting the video signals through the switch SW3 to a D/A converter 24 for the playback in the standard TV manner or to the sampling circuit 10 in the interface circuit 300 for the playback in the HDTV manner. The D/A converter 24 is adapted to convert the video and audio outputs Yd, Ud and Vd and A23 from the decoder 23 into analog video and audio signals and output the analog video and audio signals to a standard TV display unit.

Figure 2:
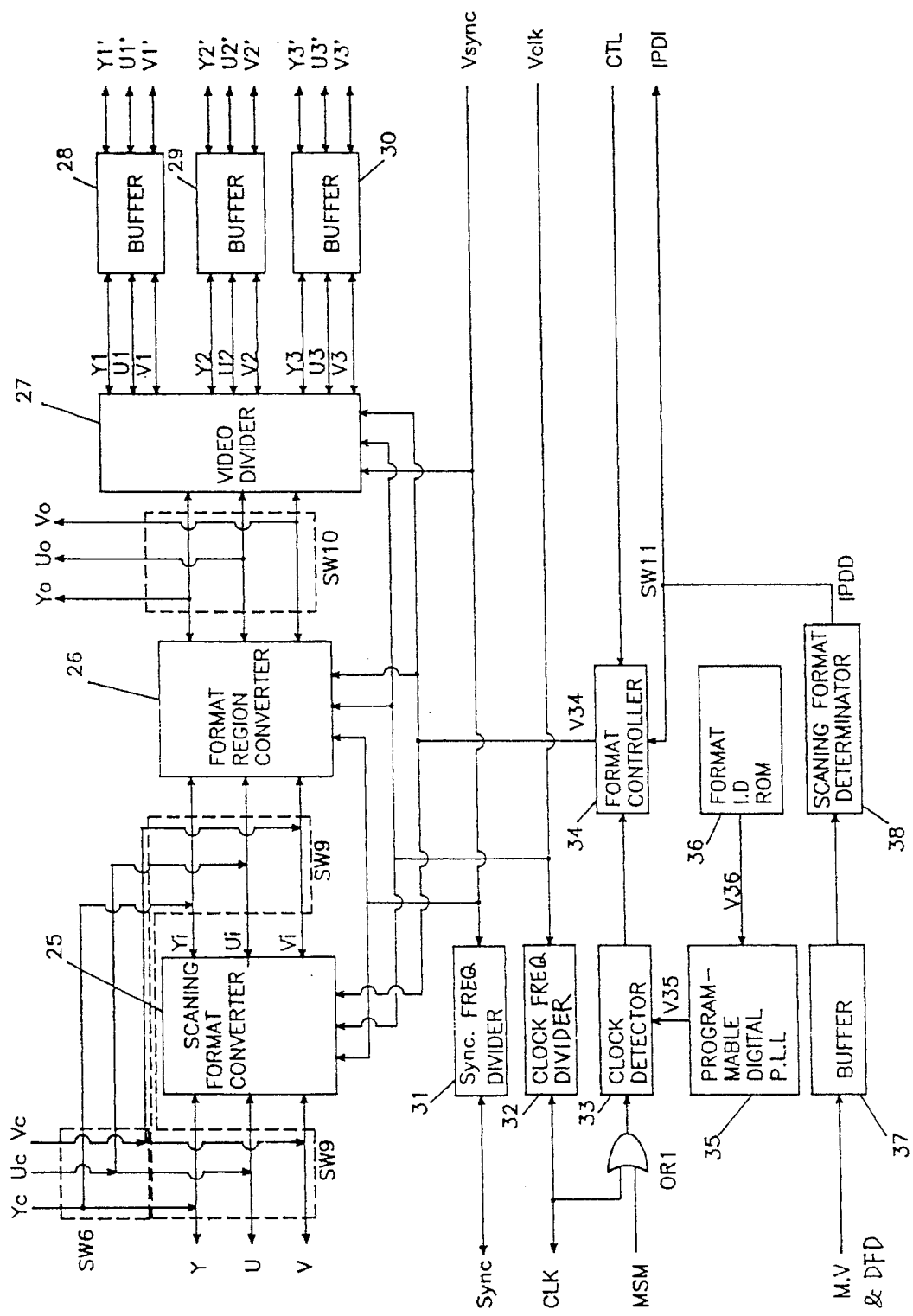
FIG. 2 is a detailed block diagram of a format converter in an interface circuit in FIG. 1.

Referring to FIG. 2, there is shown a detailed block diagram of the format conversion circuit 9 in the interface circuit 300. As shown in this drawing, the format conversion circuit 9 includes a synchronous frequency-divider 31 for frequency-dividing a synchronous signal Sync, a clock frequency-divider 32 for frequency-dividing a clock CLK, a clock detector 33 for discriminating a format of input video data Y, U and V in response to an output from an OR gate OR1 which inputs the clock CLK and a format select mode signal MSM, a format identifier (ID) read only memory (ROM) 36 for storing identifier data regarding digital data formats, a phase locked loop (PLL) 35 for adjusting a phase of an oscillating frequency in response to an output V36 from the format identifier ROM 36, a buffer 37 for buffering the motion vector M.V and the displaced frame or field difference signal DFD from the decoder 3 in the HDTV 100, and a scanning format determinator 38 for outputting scanning conversion control data IPDD in accordance with levels of the motion vector M.V and displaced frame or field difference signal DFD buffered by the buffer 37.

Also, the format conversion circuit 9 includes a format controller 34 for outputting a format control signal V34 in response to the scanning conversion control data IPDD from the scanning format determinator 38 and an output from the clock detector 33, a scanning format converter 25 for performing progressive/interlaced scanning conversion or interlaced/progressive scanning conversion with respect to the input video data Y, U and V in response to the format control signal V34 from the format controller 34, an output Vsync from the synchronous frequency-divider 31 and an output VCLK from the clock frequency-divider 32, a format region converter 26 for converting a size of video output data Yi, Ui and Vi from the scanning format converter 25 or video output data Yc, Uc and Vc from a digital camera into a desired size, a video divider 27 for dividing video output data Yo, Uo and Vo from the format region converter 26 by regions, and buffers 28–30 for buffering video outputs Y1, U1 and V1, Y2, U2 and V2 and Y3, U3 and V3 from the video divider 27, respectively.

Figure 7:
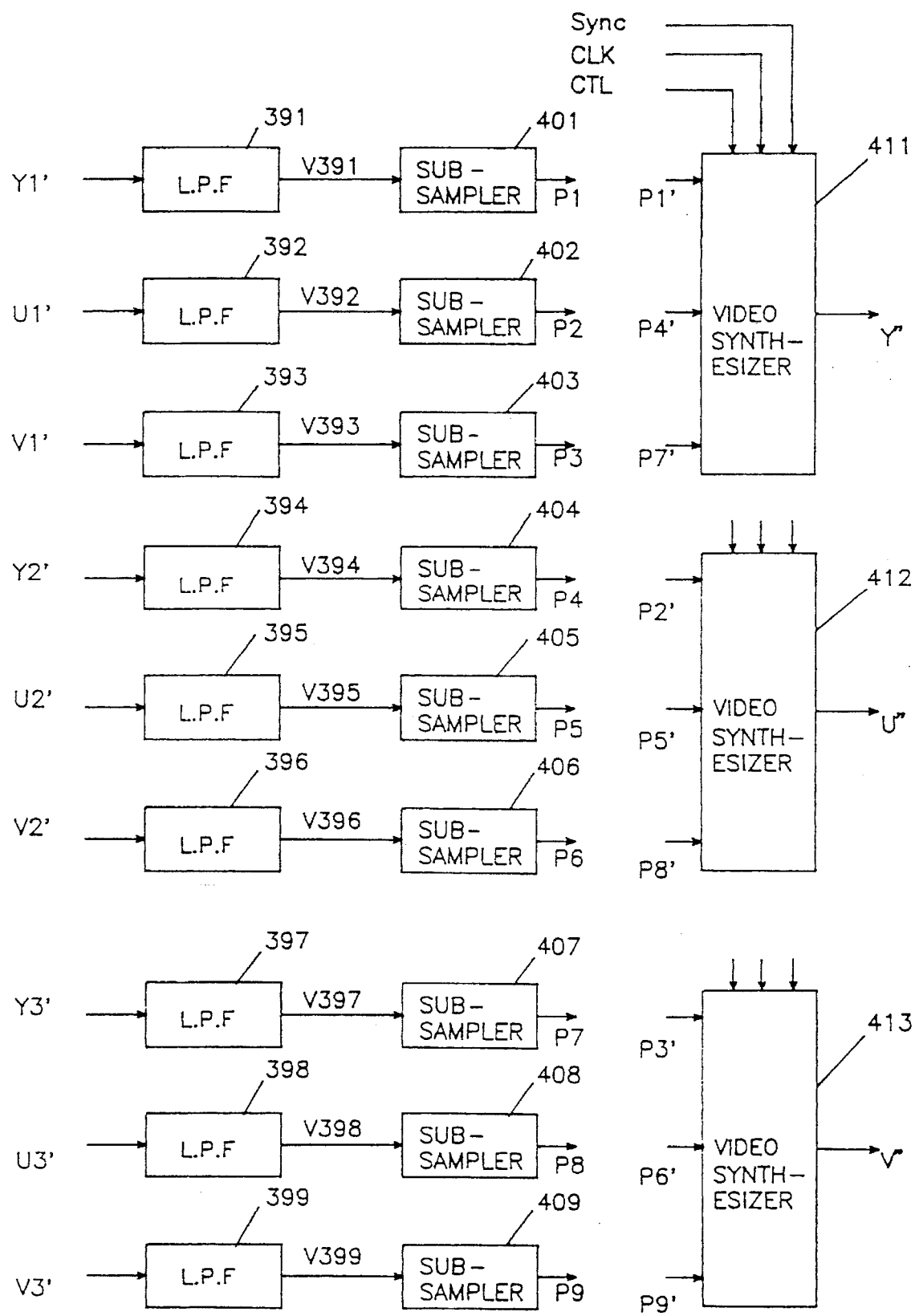
FIG. 7 is a detailed block diagram of a sub-sampler of a sampling circuit in the interface circuit in FIG. 1.

Referring to FIG. 7, there is shown a detailed block diagram of a sub-sampler 101 of the sampling circuit 10 in the interface circuit 300. As shown in this drawing, the sub-sampler 101 includes low pass filters (LPFs) 391–399 for removing high frequency components from the video outputs Y1', U1' and V1', Y2', U2' and V2' and Y3', U3' and V3' from the format conversion circuit 9, respectively, sub-sampler elements 401–409 for sub-sampling outputs V391–V399 from the low pass filters 391–399, respectively, and video synthesizers 411–413 for synthesizing Y components, U components and V components of outputs V401–V409 from the sub-sampler elements 401–409 to reform them into the video signals Y", U" and V" and outputting the reformed video signals Y", U" and V" to the encoder 15 in the digital VCR 200 through the switch SW3, respectively.

Figure 8:
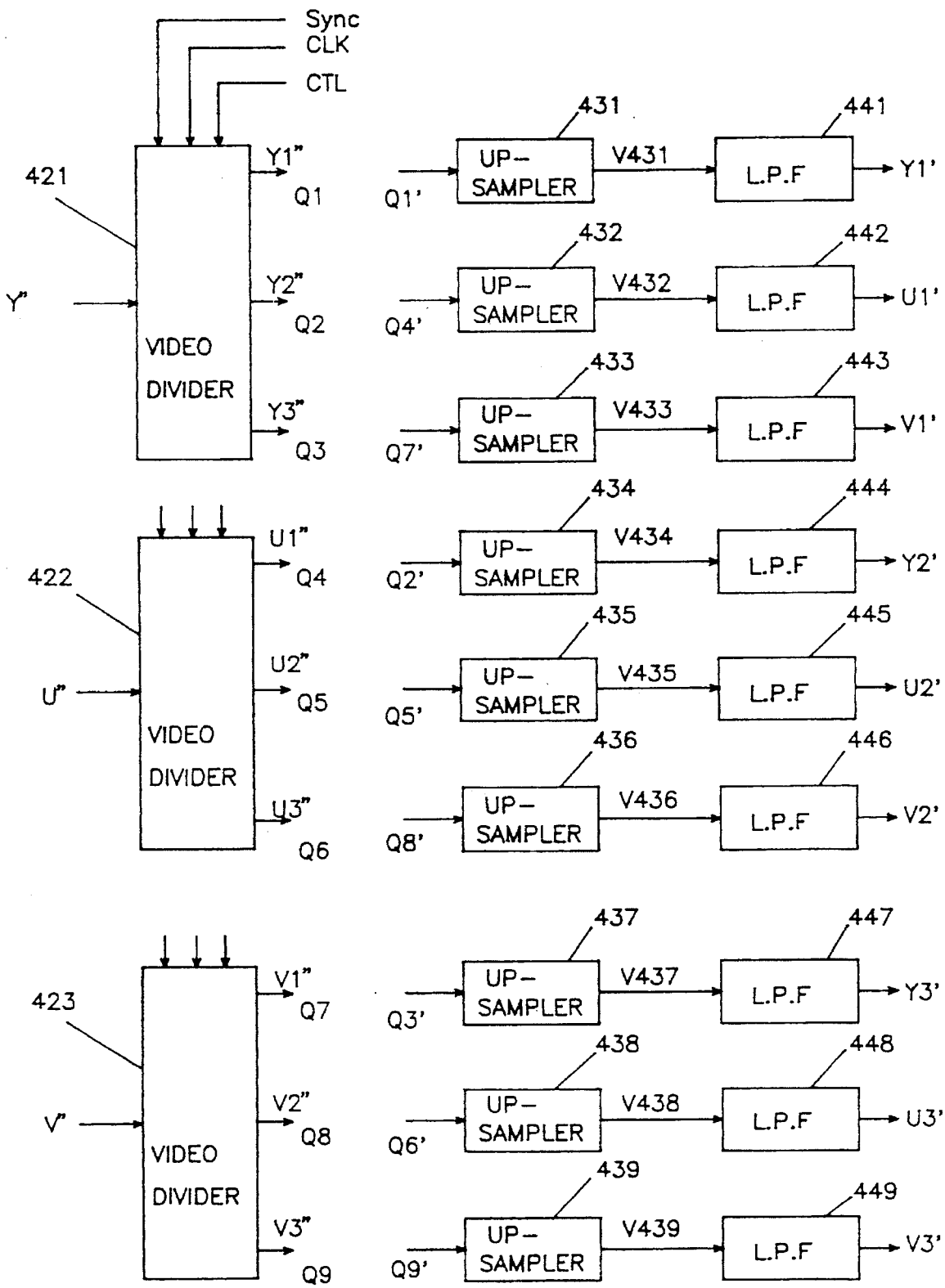
FIG. 8 is a detailed block diagram of an up-sampler of the sampling circuit in the interface circuit in FIG. 1.

Referring to FIG. 8, there is shown a detailed block diagram of an up-sampler 102 of the sampling circuit 10 in the interface circuit 300. As shown in this drawing, the up-sampler 102 includes video dividers 421–423 for receiving the video signals Y", U" and V" from the digital VCR 200 through the switch SW3 in the playback mode and dividing the received video signals by regions, respectively, up-sampler elements 431–439 for up-sampling outputs from the video dividers 421–423, respectively, and low pass filters (LPFs) 441–449 for removing high frequency components from outputs V431–V439 from the up-sampler elements 431–439 and outputting the resultant video signals to the buffers 28–30 in the format conversion circuit 9, respectively.

Figure 9:
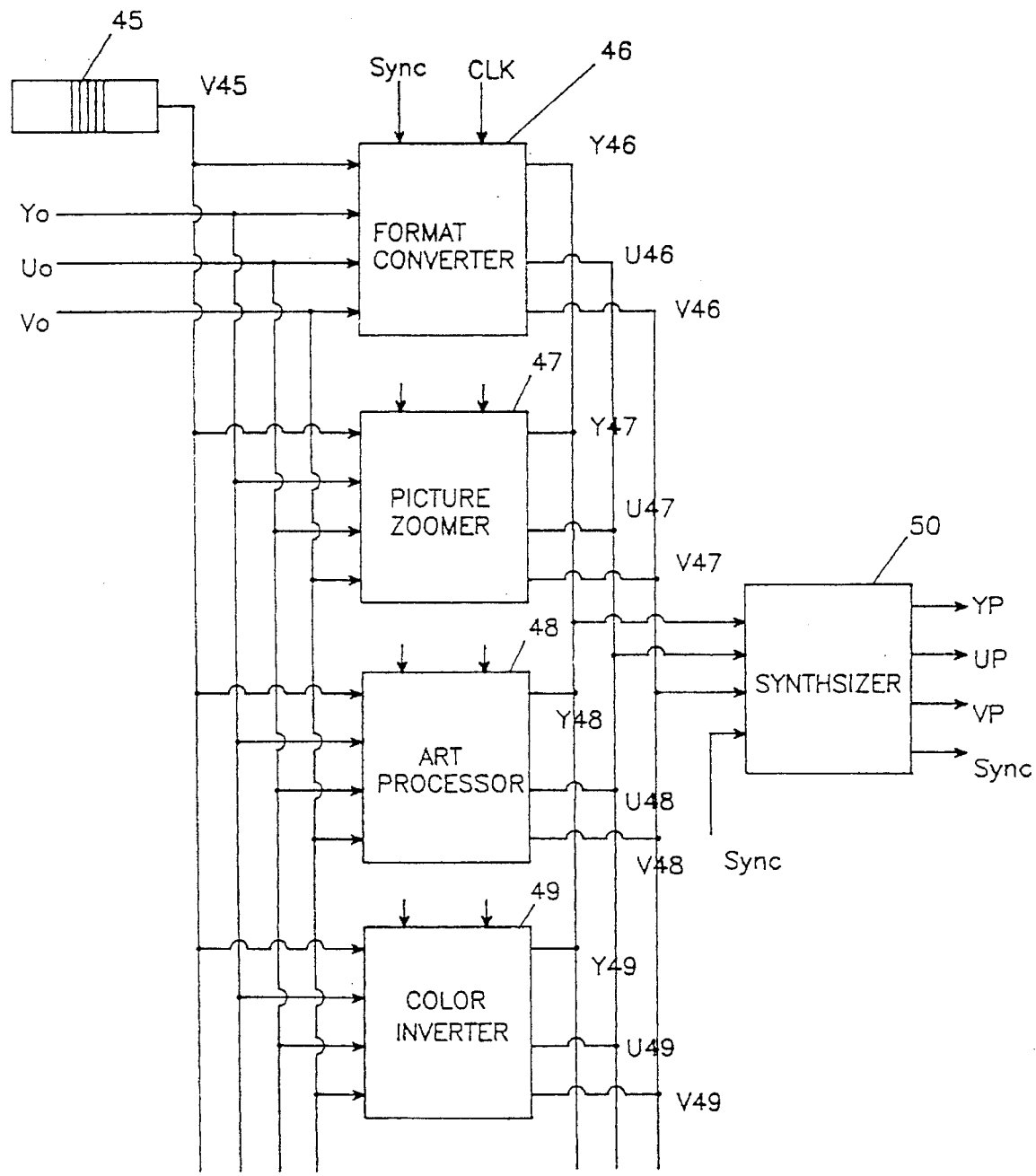
FIG. 9 is a detailed block diagram of a post-processor in the interface circuit in FIG. 1.

Referring to FIG. 9, there is shown a detailed block diagram of the post-processor 11 in the interface circuit 300. As shown in this drawing, the post-processor 11 includes a format converter 46 for converting a HDTV format of the video outputs Yo, Uo and Vo from the format conversion circuit 9 into an NTSC format, a picture zoomer 47 for adjusting a size of a video to be displayed, an art processor 48 for performing an art process such as the video edit function, a color inverter 49 for performing a color inverting function, and a synthesizer 50 for synthesizing Y components, U components and V components of outputs Y46, U46 and V46 from the format converter 46, outputs Y47, U47 and V47 from the picture zoomer 47, outputs Y48, U48 and V48 from the art processor 48 and outputs Y49, U49 and V49 from the color inverter 49 to reform them into the video signals YP, UP and VP and outputting the reformed video signals YP, UP and VP to the D/A converter 12. Here, the format converter 46, the picture zoomer 47, the art processor 48 and the color inverter 49 are controlled in response to an output V45 from a mode selector 45, the synchronous signal Sync and the clock signal CLK.

Figure 10:
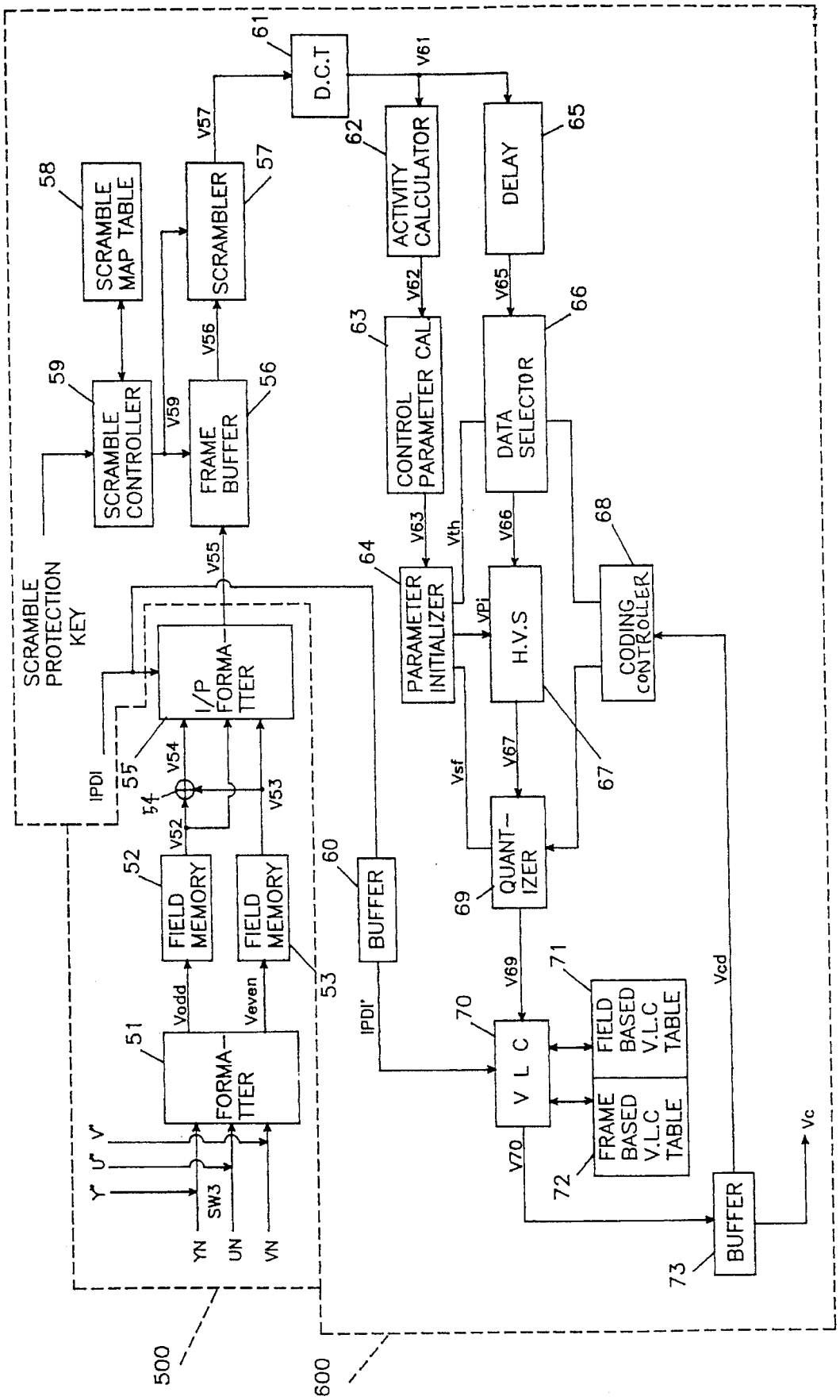
FIG. 10 is a detailed block diagram of an encoder in a digital VCR in FIG. 1.

Referring to FIG. 10, there is shown a detailed block diagram of the encoder 15 in the digital VCR 200. As shown in this drawing, the encoder 15 includes a formatting circuit 500 for formatting data inputted therein and a coding circuit 600 for scrambling output data from the formatting circuit 500 and coding the scrambled data.

The formatting circuit 500 includes a formatter 51 for receiving the video outputs YN, UN and VN from the A/D converter 14 or the video outputs Y", U" and V" from the sub-sampler 101 in the interface circuit 300 through the switch SW3 and dividing the received signals into odd and even field data Vodd and Veven, field memories 52 and 53 for storing the odd and even field data Vodd and Veven from the formatter 51, respectively, an adder 54 for adding outputs V52 and V53 from the field memories 52 and 53, and an interlaced/progressive (I/P) formatter 55 for formatting an output V54 from the adder 54 and the outputs V52 and V53 from the field memories 52 and 53 according to scanning conversion information IPDI.

The coding circuit 600 includes a scramble controller 59 for generating a scramble control signal V59 in response to a scramble protection key signal and an output from a scramble map table 58 and outputting the generated scramble control signal V59 to a frame buffer 56 and a scrambler 57.

The frame buffer 56 is adapted to temporarily store an output V55 from the I/P formatter 55 in the formatting circuit 500 in response to the scramble control signal V59 from the scramble controller 59.

The scrambler 57 is adapted to scramble an output V56 from the frame buffer 56 in response to the scramble control signal V59 from the scramble controller 59.

Also, the coding circuit includes a discrete cosine transform (DCT) unit 61 for performing a DCT operation with respect to an output V57 from the scrambler 57, an activity calculator 62 for calculating an activity of an output V61 from the DCT unit 61, a control parameter calculator 63 for calculating a control parameter V63 in response to an output V62 from the activity calculator 62, a control parameter initializer 64 being initialized in response to the calculated control parameter V63 from the control parameter calculator 63, a delay element 65 for delaying the output V61 from the DCT unit 61 for a predetermined time period, and a data selector 66 for selecting an output V65 from the delay element 65 in response to an output Vth from the control parameter initializer 64 if it is greater than a threshold level and outputting the selected data to a human visual system (HVS) unit 67.

The human visual system unit 67 is adapted to select a human visual system matched with a video characteristic of an output V66 from the data selector 66 in response to an output Vpi from the control parameter initializer 64 and multiply DCT coefficients of the output V66 from the data selector 66 by a weight function corresponding to the selected human visual system.

A quantizer 69 is adapted to quantize an output V67 from the human visual system unit 67 in response to an output Vsf from the control parameter initializer 64.

A variable length coder (VLC) 70 is adapted to perform variable length coding with respect to an output V69 from the quantizer 69 in response to information from a field based VLC table 71, information from a frame based VLC table 72 and scanning conversion information IPDI' from a buffer 60 which buffers the scanning conversion information IPDI.

The coding circuit 600 also includes a buffer 73 for buffering a coded bit stream V70 from the variable length coder 70 and applying its output Vc to the error correction coder 16, and a coding controller 68 for checking an output rate of the buffer 73 and controlling the data selector 66 and the quantizer 69 in accordance with the checked result to prevent generation of an overflow or an underflow in the coded bit stream or the output Vc from the buffer 73, thereby to make the coding stable.

Figure 12:
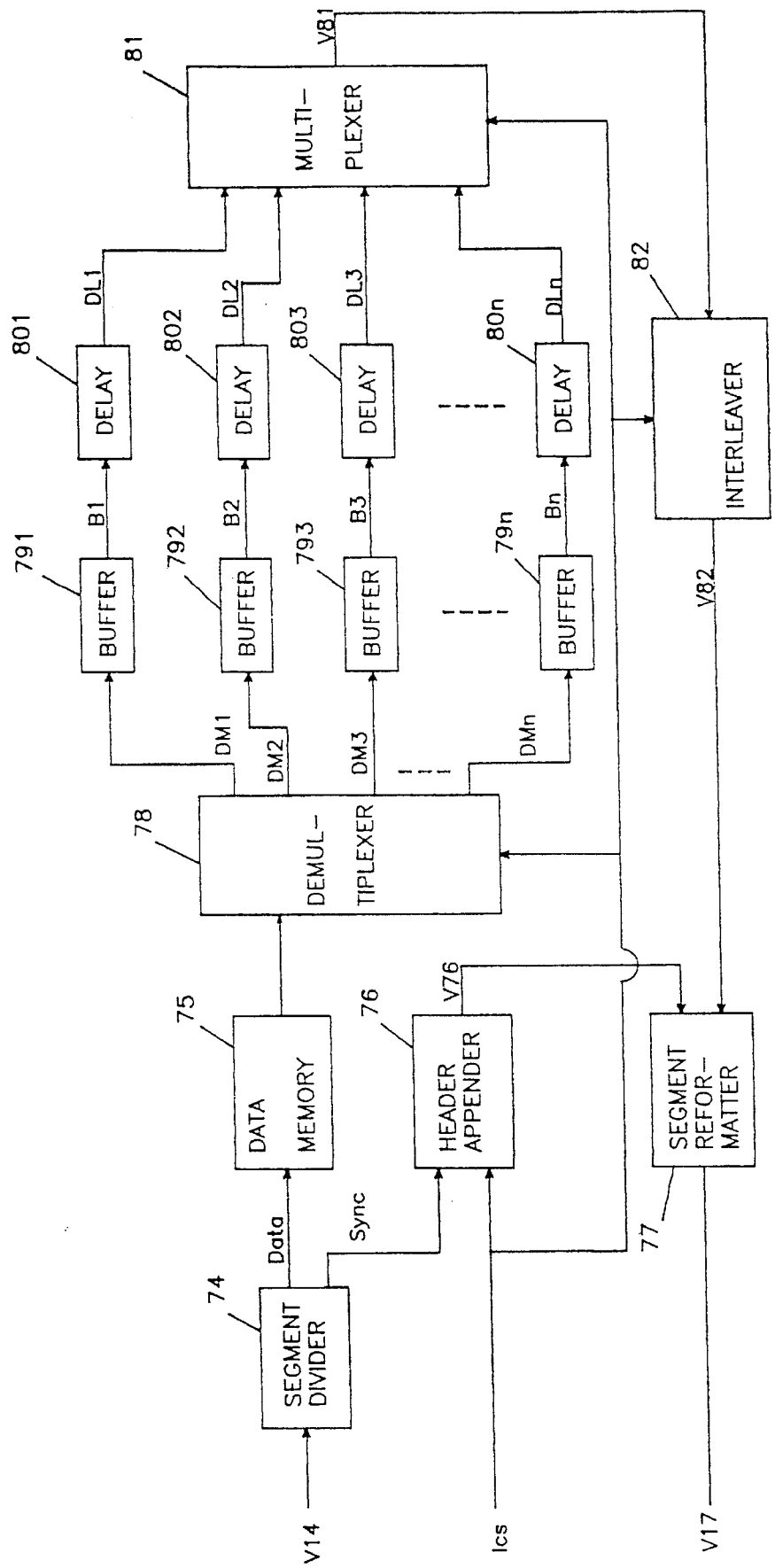
FIG. 12 is a detailed block diagram of a formatter in the digital VCR in FIG. 1.

Referring to FIG. 12, there is shown a detailed block diagram of the formatter 17 in the digital VCR 200. As shown in this drawing, the formatter 17 includes a segment separator 74 for separating the synchronous signal Sync and data information from each segment of a data bit stream or the output V16 from the error correction coder 16. The segment is a minimum unit of data to be read in a multispeed playback.

Also, the formatter 17 includes a data memory 75 for storing the data information from the segment separator 74, a header appender 76 for appending an identifier and status information to the synchronous signal Sync from the segment separator 74 in the unit of segment in response to an interleaving control signal ICS, and a demultiplexer 78 for demultiplexing an output V75 from the data memory 75 in the unit of segment in response to the interleaving control signal ICS and outputting the demultiplexed signals to buffers 791–79n, respectively.

The formatter 17 also includes delay elements 801–80n for delaying outputs B1–Bn from the buffers 791–79n for different predetermined time periods, respectively, a multiplexer 81 for multiplexing outputs Dl1–Dln from the delay elements 801–80n in response to the interleaving control signal ICS, an interleaver 82 for interleaving an output V81 from the multiplexer 81 into a new format in response to the interleaving control signal ICS, and a segment reformatter 77 for formatting an output V76 from the header appender 76 and an output V82 from the interleaver 82 into the recording format of the digital VCR 200.

Figures 3A, 3B:
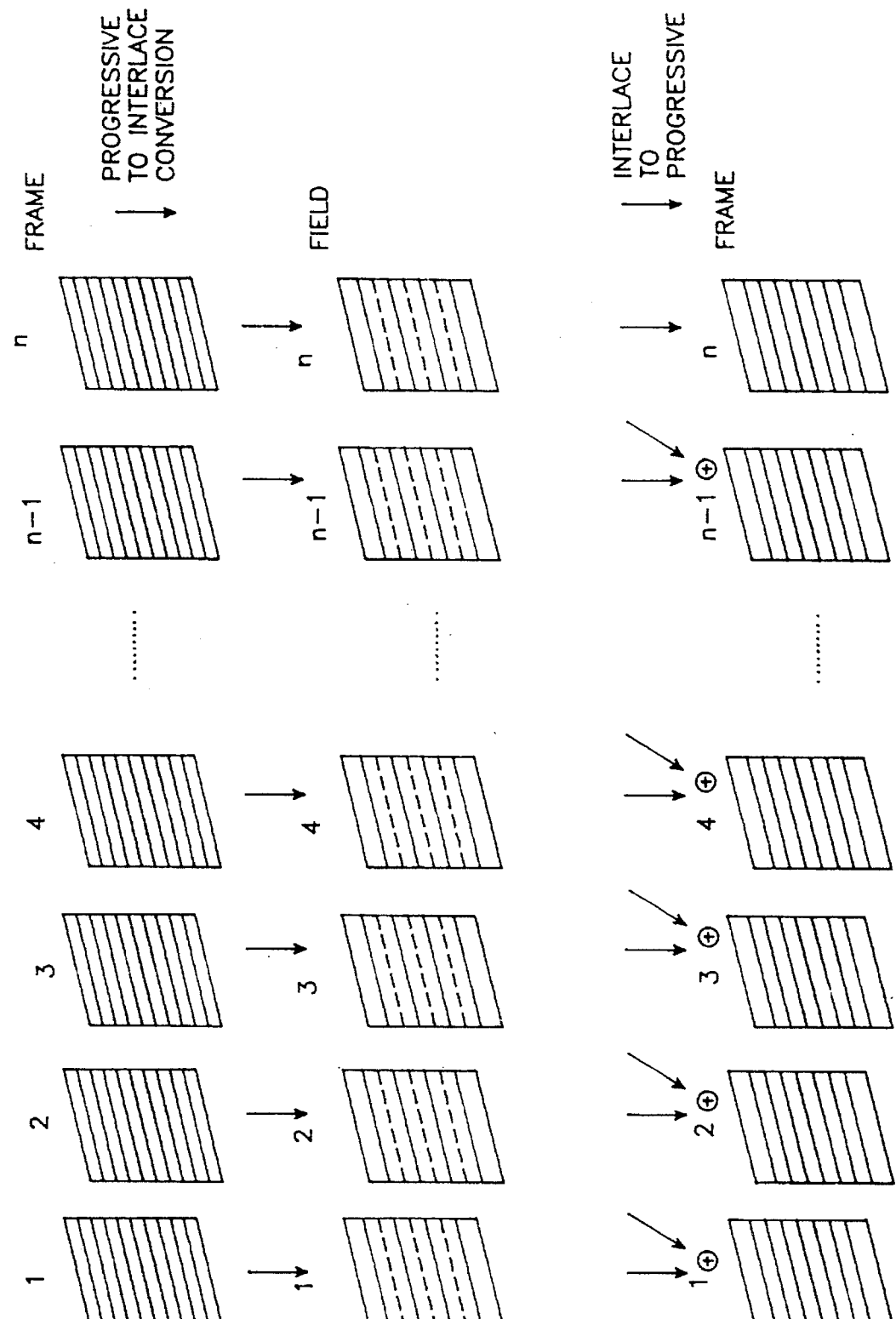
FIGS. 3A and 3B are views illustrating data scanning conversion manners in accordance with the present invention.
Figure 4:
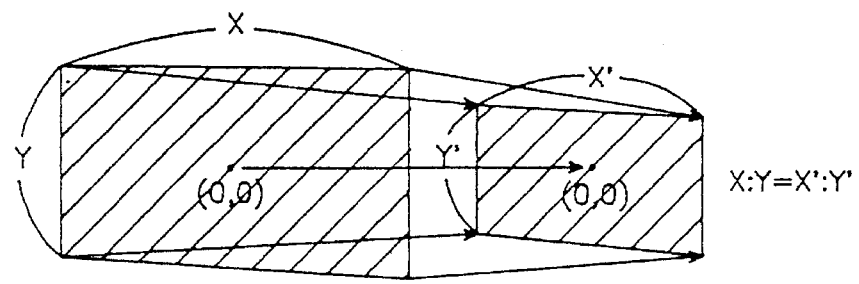
FIG. 4 is a view illustrating a data region size conversion manner in accordance with the present invention.
Figure 5:
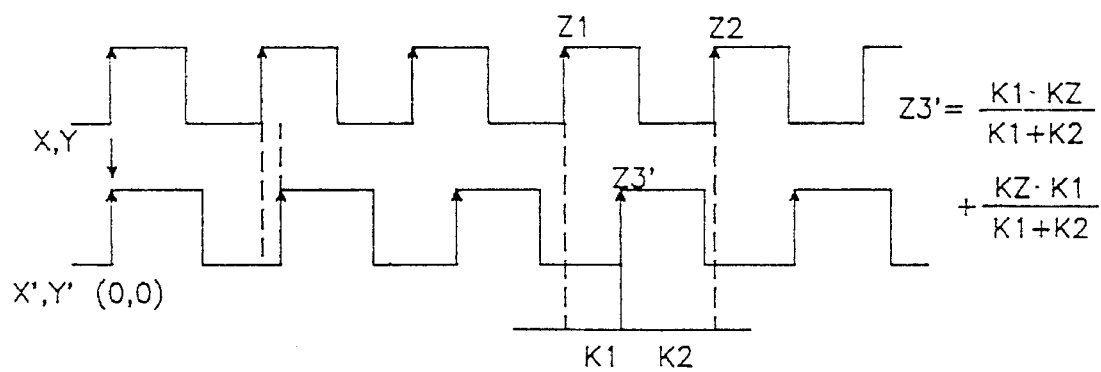
FIG. 5 is a signal waveform diagram obtained by the data region size conversion manner in FIG. 4.
Figure 6:
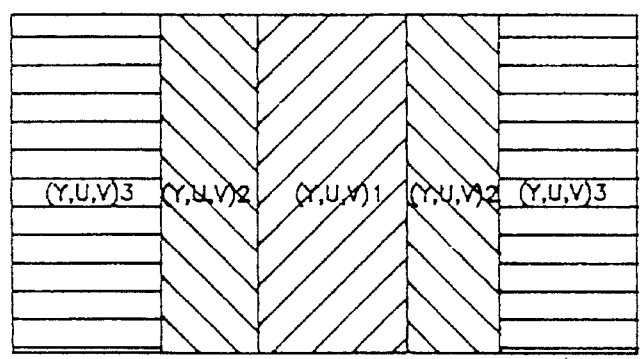
FIG. 6 is a view illustrating an example of a data region division manner in accordance with the present invention.
Figures 11A, 11B:
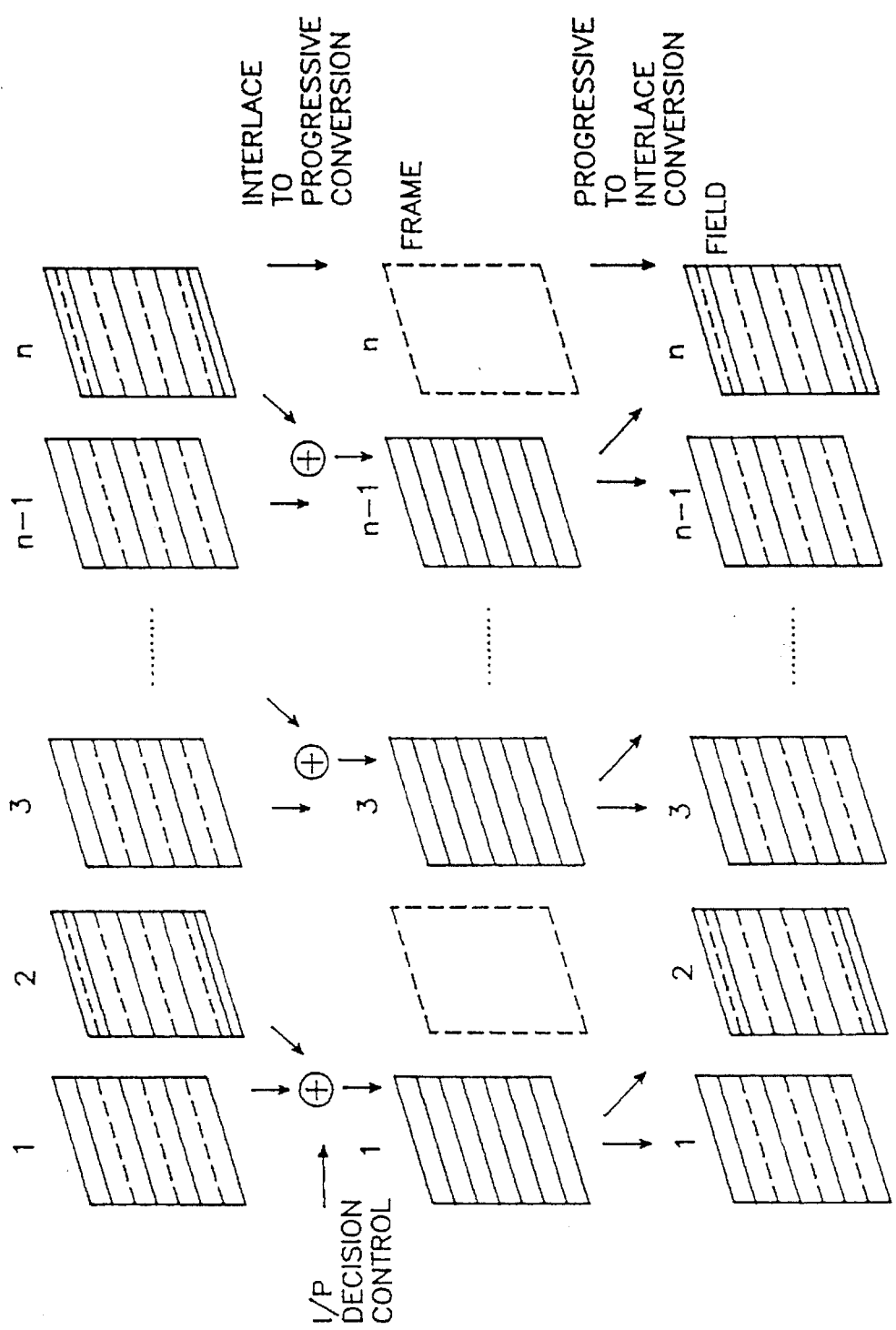
FIGS. 11A to 11C are views illustrating data scanning format conversion manners in accordance with the present invention.
Figure 11C:
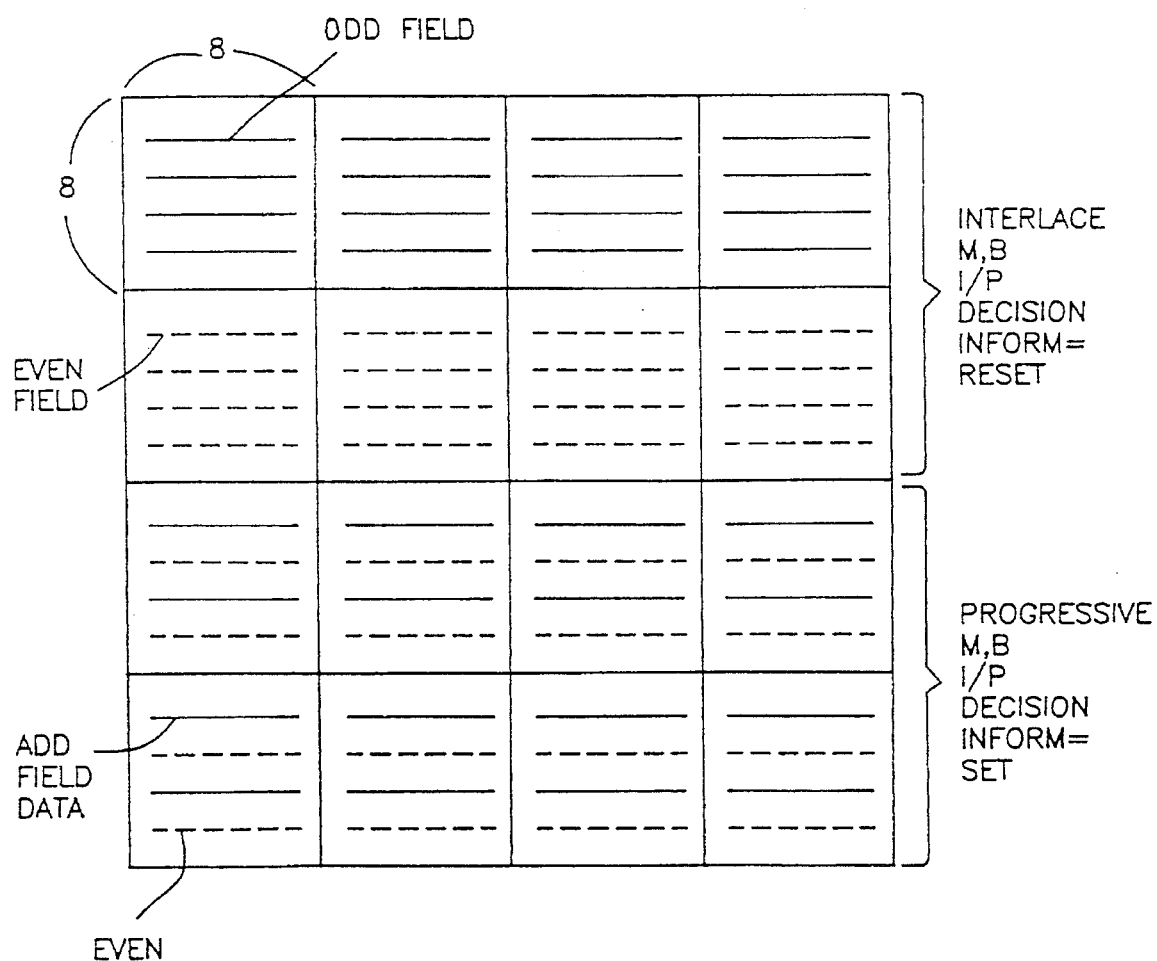
Figure 13A:
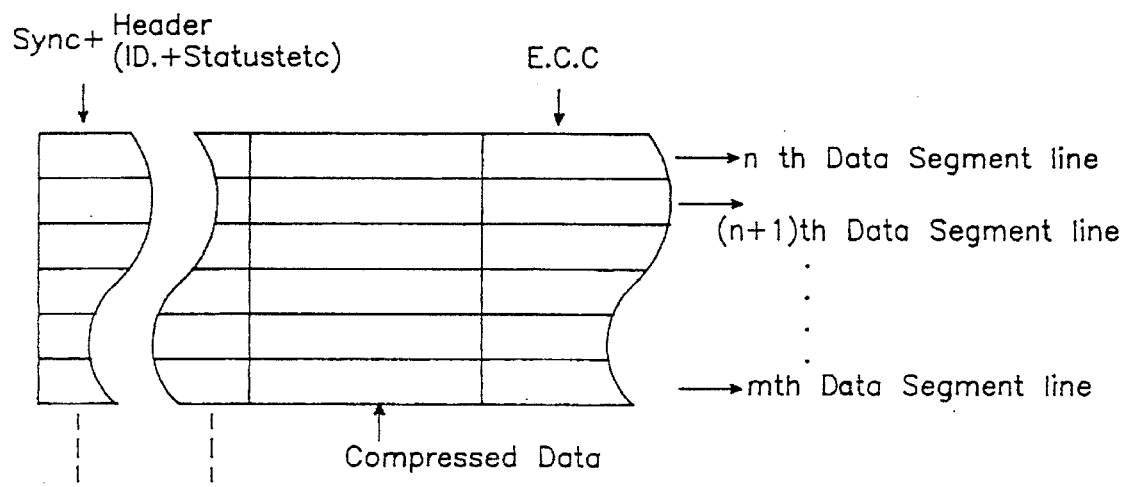
FIGS. 13A to 13C are views illustrating sequentially a data recording format conversion manner in accordance with the present invention.
Figure 13B:
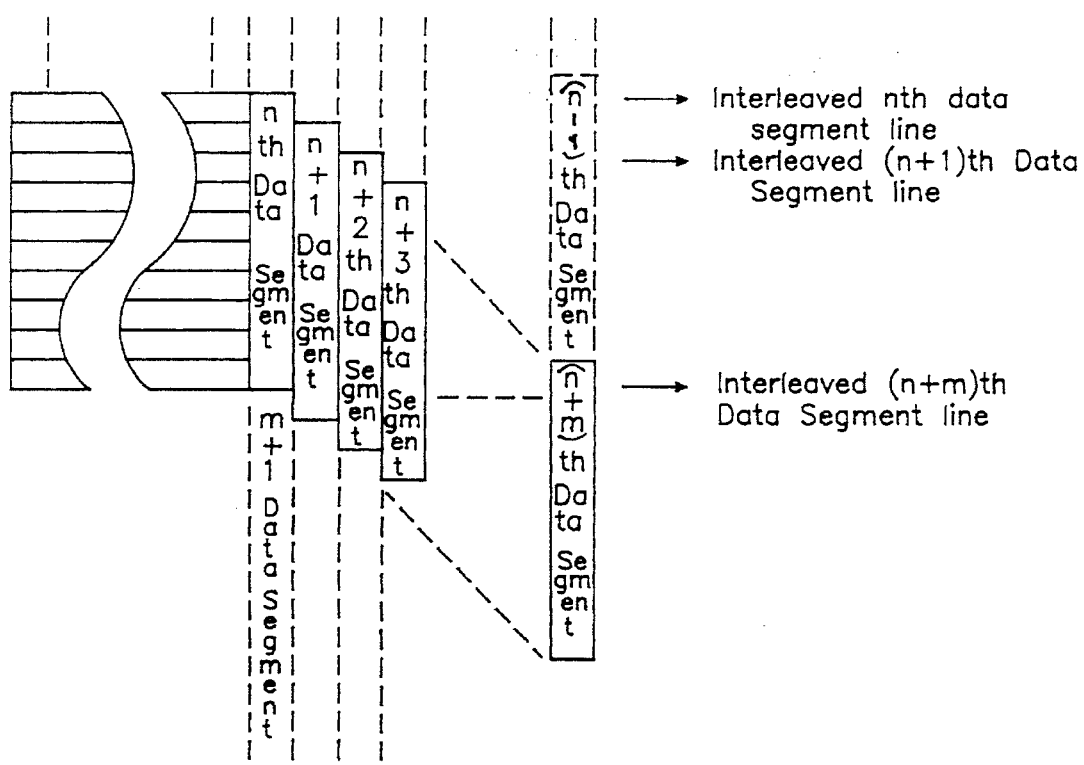
Figure 13C:
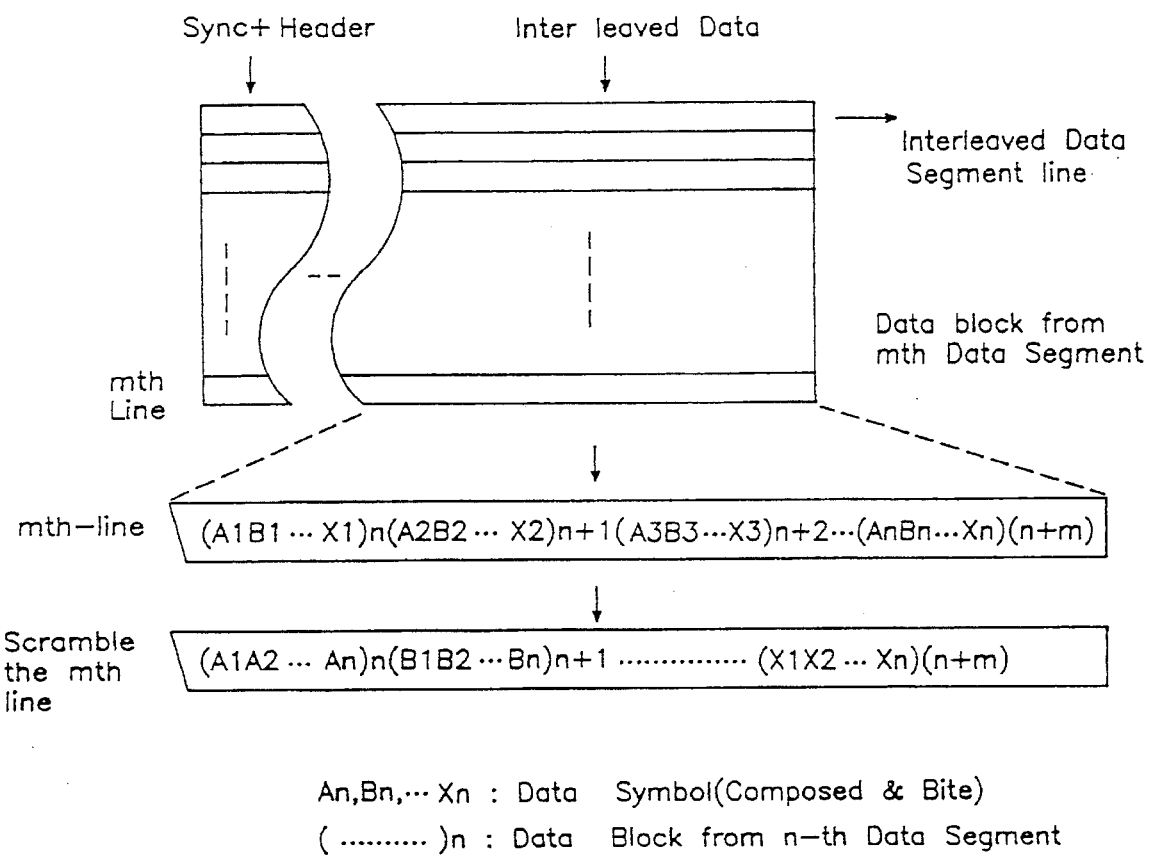

The operation of the TV-integrated VCR apparatus with the above-mentioned construction in accordance with the present invention will hereinafter be described in detail with reference to FIGS. 1 to 13C. FIGS. 3A and 3B are views illustrating data scanning conversion manners in accordance with the present invention, FIG. 4 is a view illustrating a data region size conversion manner in accordance with the present invention, FIG. 5 is a signal waveform diagram obtained by the data region size conversion manner in FIG. 4, FIG. 6 is a view illustrating a data region division manner in accordance with the present invention, FIGS. 11A to 11C are views illustrating data scanning format conversion manners in accordance with the present invention, and FIGS. 13A to 13C are views illustrating sequentially a data recording format conversion manner in accordance with the present invention.

First, in the case where the compressed HDTV broadcasting signal HDi from the broadcasting station is received by the HDTV 100, it is tuned to a desired channel by the tuner 1 and then applied to the demodulator 2. The demodulator 2 demodulates the tuned broadcasting signal V1 from the tuner 1. Also, the demodulator 2 corrects the error component mixed into the broadcasting signal V1 during the transmission and separates the video signal V2 and the audio signal A2 from the error-corrected signal.

The decoder 3 detects the motion vector M.V and the displaced frame or field difference signal DFD from the video signal V2 from the demodulator 2. Also, the decoder 3 expands the video signal V2 and the audio signal A2 from the demodulator 2 and outputs the expanded video signals YH, UH and VH and the expanded audio signal A3. The expanded audio signal A3 from the decoder 3 is applied to the D/A converter 6 and the expanded video signals YH, UH and VH therefrom are applied to the video processor 4 through the switch SW2. The video processor 4 receives the video signals YH, UH and VH from the decoder 3 through the switch SW2 and restores the received signals into the original color signals R, G and B, which are then applied to the D/A converter 5. The D/A converter 5 converts the color signals R, G and B from the video processor 4 into the analog video signal and outputs the converted analog video signal to the high definition monitor Monitor 1. As a result, a high definition video is displayed on a screen of the high definition monitor Monitor 1. On the other hand, the audio signal A3 from the decoder 3 is converted into the analog audio signal by the D/A converter 6 and then applied to the speaker SP1.

On the other hand, in the case where the standard TV broadcasting signal NTSC from the broadcasting station is received by the digital VCR 200, it is tuned to a desired channel and then demodulated by the tuner/demodulator circuit 13. Also, the tune/demodulator circuit 13 corrects the error component mixed into the broadcasting signal during the transmission and separates the video signal NVi and the audio signal NAi from the error-corrected signal. The A/D converter 14 converts the video and audio signals NVi and NAi from the tuner/demodulator circuit 13 into the digital signals. The resultant audio signal A14 from the A/D converter 14 is applied directly to the encoder 15 and the resultant video signals YN, UN and VN therefrom are applied through the switch SW3 to the encoder 15.

In the encoder 15, as shown in FIG. 10, the formatter 51 receives the video signals YN, UN and VN from the A/D converter 14 through the switch SW3 and divides the received signals into the odd and even field data Vodd and Veven, which are then stored into the field memories 52 and 53, respectively. The adder 54 adds the output data V52 and V53 from the field memories 52 and 53 and outputs the added data V54 to the I/P formatter 55, which also receives the output data V52 and V53 from the field memories 52 and 53.

The I/P formatter 55 formats the output data V54 from the adder 54 and the output data V52 and V53 from the field memories 52 and 53 into frame, even field and odd field blocks according to the scanning conversion information IPDI, respectively, as shown in FIG. 11A.

On the other hand, the scramble controller 59 reads scramble information from the scramble map table 58 in response to the scramble protection key signal set by the user and generates the scramble control signal V59 in accordance with the read scramble information. The scramble control signal V59 from the scramble controller 59 is applied to the frame buffer 56 and the scrambler 57.

The frame buffer 56 stores temporarily the output V55 from the I/P formatter 55 in response to the scramble control signal V59 from the scramble controller 59 and outputs the stored signal to the scrambler 57. Then, under the control of the scramble controller 59, the scrambler 57 scrambles the output data V56 from the frame buffer 56 according to a desired rule. With this scrambling process, the output data V56 from the frame buffer 56 becomes uniform in length, resulting in a reduction of a burst error component. This uniformity also makes the control of the buffer 73 easy. On the other hand, provided that a key input signal is different from the scramble protection key signal previously set by the user, the scrambling of the scrambler 57 is not performed normally, resulting in formation of an undesirable video.

Then, the DCT coefficients of the output V57 from the scrambler 57 are obtained by the DCT operation of the DCT unit 61 and applied to the activity calculator 62. The activity calculator 62 obtains the activity of the DCT coefficients from the DCT unit 61 by summing absolute values thereof. On the basis of the obtained activity V62 from the activity calculator 62, the control parameter calculator 63 calculates the control parameter V63 and outputs the calculated control parameter V63 to the control parameter initializer 64, thereby causing the control parameter initializer 64 to be initialized. As a result of the initialization, the control parameter initializer 64 outputs the control signals Vth, Vpi and Vsf to the data selector 66, the human visual system unit 67 and the quantizer 69, respectively.

The output V61 from the DCT unit 61 is also delayed by the delay element 65 for the predetermined time period and then applied to the data selector 66. The data selector 62 functions to select the output data V65 from the delay element 65 in response to the control output Vth from the control parameter initializer 64 if it is greater than the threshold level and output the selected data V66 to the human visual system unit 67. The human visual system unit 67 selects the human visual system matched with the video characteristic of the output V66 from the data selector 66 in response to the control output Vpi from the control parameter initializer 64. Then, the human visual system unit 67 multiplies the DCT coefficients of the output V66 from the data selector 66 by the weight function corresponding to the selected human visual system. The output V67 from the human visual system unit 67 is then quantized by the quantizer 69 depending on the control output Vsf from the control parameter initializer 64.

The variable length coding is performed with respect to the output V69 from the quantizer 69 by the variable length coder 70 on the basis of the information from the field based VLC table 71, the information from the frame based VLC table 72 and the buffered scanning conversion information IPDI' from the buffer 60. Thus, the variable length coder 70 outputs the coded bit stream V70. Here, the use of the field based VLC table 71 and the frame based VLC table 72 makes the compression effect higher.

The buffer 73 buffers the coded bit stream V70 from the variable length coder 70 and outputs the buffered bit stream to the error correction coder 16 in FIG. 1 at a fixed output rate. To maintain the output rate of the buffer 73, or the number of bits per frame, fixed, the coding controller 68 controls the data selector 66 and the quantizer 69. This fixing of the output rate has the effect of preventing the generation of the overflow or the underflow in the coded bit stream. Therefore, the coding operation is stably performed.

On the other hand, the audio signal A14 from the A/D converter 14 is encoded by the encoder 15 and then applied to the error correction coder 16 through the switch SW4.

In the above-mentioned manner, in the encoder 15, the input video data YN, UN and VN or Y", U" and V" are not sequentially processed but scrambled in the unit of a fixed size of block and then coded in the unit of segment including a desired number of blocks. As a result, an amount of the output data Vc from the buffer 73 can be checked in the unit of segment. If the checked data amount is greater than a desired data transmission rate, it is anticipated that the next segment will be greater than the desired data transmission rate, too. In this case, in response to a feedback control signal Vcb, the coding controller 68 controls the data selector 66 and the quantizer 69 such that the amount of the output data from the buffer 73 can readily converge on the desired value.

Then, the error correction coder 16 corrects the error components of the video and audio outputs V15 and A15 from the encoder 15 and outputs the error-corrected signal V16 to the formatter 17. In the formatter 17, as shown in FIG. 12, the segment separator 74 separates the synchronous signal Sync and the data information from each segment of the data bit stream of the output V16 from the error correction coder 16. The data information from the segment separator 74 is applied to the data memory 75 and the synchronous signal Sync therefrom is applied to the header appender 76.

The data memory 75 stores the data information from the segment separator 74 and outputs the stored data to the demultiplexer 78. The header appender 76 appends the identifier ID, the status information and other information to the synchronous signal Sync from the segment separator 74 in the unit of segment in response to the interleaving control signal ICS, as shown in FIG. 13A. Then, the output V76 from the header appender 76 is applied to the segment reformatter 77.

The output V75 from the data memory 75 is demultiplexed into signals DM1-DMn in the unit of segment by the demultiplexer 78 according to the interleaving control signal ICS. The demultiplexed outputs DM1-DMn from the demultiplexer 78 are buffered by the buffers 791-79n and then delayed for the different predetermined time period by the delay elements 801-80n, respectively. Noticeably, the difference in the delay time periods of the segments results in 90°-rotation of each segment as shown in FIG. 13B. Namely, the difference in the delay time periods of the segments results in no discontinuity of the segments. As a result, a track deviation of the heads has no effect on detection of an information amount by the heads although it is produced in a multispeed playback mode. Therefore, a good picture quality can be obtained in the multispeed playback mode.

Subsequently, the multiplexer 81 multiplexes the outputs Dl1-Dln from the delay elements 801-80n in response to the interleaving control signal ICS. The output V81 from the multiplexer 81 is interleaved into the new format through an inter-symbol interleaving process by the interleaver 82 depending on the interleaving control signal ICS. As a result, the interleaver 82 outputs the signal V82 tough against the burst error component as shown in FIG. 13C. Then, the segment reformatter 77 formats the output V76 from the header appender 76 and the output V82 from the interleaver 82 into the recording format of the digital VCR 200 and outputs the resultant data stream to the channel modulator 18 in FIG. 1.

The channel modulator 18 modulates the output V17 from the formatter 17 suitably to the characteristic of the magnetic tape and the channel characteristic. Then, the output V18 from the channel modulator 18 is amplified by the predetermined level by the recording amplifier 19 and recorded on the magnetic tape through the heads HD1 and HD2 being switched by a switch SW7.

On the other hand, in the case where the HDTV signal HDi received by the HDTV 100 is to be recorded in the digital VCR 200, the audio signal A2 from the demodulator 2 in the HDTV 100 of FIG. 1 is applied to the digital audio input/output unit 7 in the interface circuit 300 through the switch SW1, and the video signal V2 therefrom is decoded by the decoder 3 and then applied to the format conversion circuit 9 in the interface circuit 300 through the switches SW2 and SW6.

In the format conversion circuit 9, as shown in FIG. 2, the clock detector 33 discriminates the format of the input video data Y, U and V or Yc, Uc and Vc in response to the output from the OR gate OR1 which inputs the clock CLK and the format select mode signal MSM. Then, the PLL 35 adjusts the phase of the oscillating frequency in response to the output V36 from the format identifier ROM 36 corresponding to the format discriminated by the clock detector 33, and outputs the phase-adjusted oscillating frequency V35 to the clock detector 33. As a result, the format controller 34 outputs the format control signal V34 in response to the output V33 from the clock detector 33, thereby allowing the scanning format converter 25 to perform the progressive/interlaced scanning conversion with respect to the input video data Y, U and V or Yc, Uc and Vc to reduce band widths thereof if the format is the progressive scanning type, while to pass them through a switch SW9 if the format is the interlaced scanning type. On the other hand, the synchronous signal Sync and the clock CLK are frequency-divided by the synchronous frequency-divider 31 and the clock frequency-divider 32, respectively, suitably to the recording format of the digital VCR 200.

In other words, if the format of the input video data Y, U and V or Yc, Uc and Vc is the progressive scanning type, the scanning format converter 25 converts the input video data Y, U and V or Yc, Uc and Vc of the progressive scanning type into the video data Yi, Ui and Vi of the interlaced scanning type as shown in FIG. 3A, and outputs the converted video data Yi, Ui and Vi to the format region converter 26. On the contrary, if the format of the input video data Y, U and V or Yc, Uc and Vc is the interlaced scanning type, the scanning format converter 25 passes the video data Y, U and V or Yc, Uc and Vc of the interlaced scanning type to the format region converter 26 through the switch SW9.

As shown in FIG. 4, the format region converter 26 converts a size (X,Y) of the input video data into a desired size (X',Y') by performing a down-sampling operation. Namely, as shown in FIGS. 4 and 5, if X/X'>1, Y/Y'>1 and Int(n·X/X')<n·X/X'<Int(n·X/X'+1), the Z'n can be obtained as follows:

$$Z'N = [n \cdot X/X' - \text{Int}(n \cdot X/X')] \cdot Z_{\text{Int}(n \cdot X/X'+1)} + [\text{Int}(n \cdot X/X'+1) - n \cdot X/X'] \cdot Z_{\text{Int}(n \cdot X/X')} \quad (1)$$

With the above equation (1), the size (X,Y) of the input video data can readily be converted into the desired size (X',Y').

The video output data Yo, Uo and Vo from the format region converter 26 are applied to the video divider 27 through a switch SW 10. The video divider 27 divides the received video data into a plurality of parts Y1, U1 and V1, Y2, U2 and V2 and Y3, U3 and V3 according to a video importance as shown in FIG. 6. Then, the buffers 28–30 buffer the video outputs Y1, U1 and V1, Y2, U2 and V2 and Y3, U3 and V3 from the video divider 27, respectively, and output the buffered video data Y1', U1' and V1', Y2', U2' and V2' and Y3', U3' and V3' to the sub-sampler 101 of the sampling circuit 10 in FIGS. 1 and 7, respectively. Also, the video output data Yo, Uo and Vo from the format region converter 26 are applied through the switch SW10 to the post-processor 11 in FIGS. 1 and 9.

In the post-processor 11, as shown in FIG. 9, the video output data Yo, Uo and Vo from the format region converter 26 in the format conversion circuit 9 are processed by the format converter 46, the picture zoomer 47, the art processor 48 and the color inverter 49 under the control of the mode selector 45. As a result, the PIP function, the zooming function, the art processing function and the color inverting function can be performed by the format converter 46, the picture zoomer 47, the art processor 48 and the color inverter 49, respectively. Then, the synthesizer 50 synthesizes the Y components, U components and V components of the outputs Y46, U46 and V46 from the format converter 46, the outputs Y47, U47 and V47 from the picture zoomer 47, the outputs Y48, U48 and V48 from the art processor 48 and the outputs Y49, U49 and V49 from the color inverter 49 in response to the synchronous signal Sync, respectively. In result, the synthesized video outputs YP, UP and VP from the synthesizer 50 are converted into the analog video signal by the D/A converter 12 in FIG. 1 and then outputted to the standard TV monitor Monitor2.

Namely, the post-processor 11 acts to display the HDTV broadcasting signal in the NTSC manner or perform the PIP function, the zooming function, the art processing function and etc. of the NTSC broadcasting signal. Therefore, the post-processor 11 provides the compatibility between the HDTV system and the NTSC TV system.

On the other hand, in the sub-sampler 101, as shown in FIG. 7, the low pass filters 391–399 remove the high frequency components from the video outputs Y1', U1' and V1', Y2', U2' and V2' and Y3', U3' and V3' from the format conversion circuit 9, respectively, to limit frequency bands thereof for prevention of a video overlapped phenomenon. Then, the sub-sampler elements 401–409 sub-sample the outputs V391–V399 from the low pass filters 391–399, respectively, to reduce the data amount thereof. Noticeably, the filtering and sub-sampling are performed to allocate more information to important video portions, while less information to unimportant video portions. Therefore, the data can efficiently be compressed.

Then, the outputs V401, V404 and V407 from the sub-sampler elements 401, 404 and 407 are applied to the video synthesizer 411 through output terminals P1, P4 and P7 thereof and input terminals P1', P4' and P7' of the video synthesizer 411. Also, the outputs V402, V405 and V408 from the sub-sampler elements 402, 405 and 408 are applied to the video synthesizer 412 through output terminals P2, P5 and P8 thereof and input terminals P2', P5' and P8' of the video synthesizer 412. Further, the outputs V403, V406 and V409 from the sub-sampler elements 403, 406 and 409 are applied to the video synthesizer 413 through output terminals P3, P6 and P9 thereof and input terminals P3', P6' and P9' of the video synthesizer 413. In response to the synchronous signal Sync, the clock CLK and a control signal CTL, the video synthesizers 411–413 synthesize the Y components, U components and V components of the outputs V401–V409 from the sub-sampler elements 401–409 to reform them into the original video signals Y", U" and V", respectively.

In other words, the video data Y, U and V from the HDTV 100 or the video data Yc, Uc and Vc from the digital camera are converted into the video data Y", U" and V" of the interlaced scanning type as shown in FIG. 11B by the interface circuit 300. Then, the video data Y", U" and V" of the interlaced scanning type from the interface circuit 300 are applied to the encoder 15 through the switch SW3.

In the encoder 15, the formatter 51 divides the received video data Y", U" and V" of the interlaced scanning type into the odd and even field data Vodd and Veven, which are then stored into the field memories 52 and 53, respectively. The adder 54 adds the output data V52 and V53 from the field memories 52 and 53 and outputs the added data V54 to the I/P formatter 55, which also receives the output data V52 and V53 from the field memories 52 and 53.

The I/P formatter 55 formats the output data V54 from the adder 54 and the output data V52 and V53 from the field memories 52 and 53 into interlaced macro blocks or progressive macro blocks according to the scanning conversion information IPDI, and outputs the formatted blocks to the frame buffer 56. FIG. 11C shows examples of the interlaced macro blocks and the progressive macro blocks. The output data from the frame buffer 56 is coded in the compression manner suitable to the digital VCR 200 through the subsequent procedure of the encoder 15, which is similar to that in the case where the NTSC signal is received by the digital VCR 200 as mentioned previously and details thereof will thus be omitted.

Then, the error correction coder 16 receives the video output V15 from the encoder 15 directly and the audio signal A7 from the digital audio input/output unit 7 through the switch SW4 and corrects the error components of the received video and audio signals. The formatter 17 formats the output V 16 from the error correction coder 16 into the recording format of the digital VCR 200 and the channel modulator 18 modulates the output V17 from the formatter 17 suitably to the characteristic of the magnetic tape and the channel characteristic. Then, the output V18 from the channel modulator 18 is amplified by the predetermined level by the recording amplifier 19 and recorded on the magnetic tape through the heads HD1 and HD2 being switched by the switch SW7.

On the other hand, in the case where the recorded HDTV or standard TV signal is to be played back in the standard TV manner, the data recorded on the magnetic tape is detected by the heads HD3 and HD4, and then amplified by the predetermined level and compensated for the distortion by the playback amplifier/equalizer circuit 20. Then, the output V20 from the amplifier/equalizer circuit 20 is demodulated suitably to the original characteristic by the channel demodulator 21 and applied to the deformatter/error correction decoder circuit 22.

The deformatter/error correction decoder circuit 22 converts the format of the output V21 from the channel demodulator 21 into the original format and corrects the error component of the converted signal. The deformatter/error correction decoder circuit 22 then separates the video and audio signals V22 and A22 from the error-corrected signal. The decoder 23 decodes the video and audio outputs V22 and A22 from the deformatter/error correction decoder circuit 22 into the original signals Yd, Ud and Vd and A23. Then, the D/A converter 24 receives the video signals Yd, Ud and Vd from the decoder 23 through the switch SW3 and the audio signal A23 therefrom directly and converts the received signals into the analog NTSC video and audio signals V24 and A24, respectively.

On the other hand, in the case where the recorded HDTV or standard TV signal is to be played back in the HDTV manner, the data recorded on the magnetic tape is detected by the heads HD3 and HD4 and then sequentially processed by the playback amplifier/equalizer circuit 20, the channel demodulator 21 and the deformatter/error correction decoder circuit 22 in the same manner as in the standard TV manner. By the way, the video outputs Yd, Ud and Vd from the decoder 23 are applied through the switch SW3 to the up-sampler 102 in the interface 300 in FIG. 8.

In the up-sampler 102, as shown in FIG. 8, the video dividers 421–423 divide the video outputs Yd, Ud and Vd from the decoder 23 by regions in response to the synchronous signal Sync, the clock CLK and the control signal CTL, respectively. The outputs Y1"–Y3" from the video divider 421 are applied to the up-sampler elements 431, 434 and 437 through output terminals Q1–Q3 thereof and input terminals Q1'–Q3' of the video divider 421, respectively. Also, the outputs U1"–U3" from the video divider 422 are applied to the up-sampler elements 432, 435 and 438 through output terminals Q4–Q6 thereof and input terminals Q4'–Q6' of the video divider 422, respectively. Further, the outputs V1"–V3" from the video divider 423 are applied to the up-sampler elements 433, 436 and 439 through output terminals Q7–Q9 thereof and input terminals Q7'–Q9' of the video divider 423, respectively. Here, the video dividers 421–423 are operated under the control of the synchronous signal Sync, the clock CLK and the control signal CTL. The up-sampler elements 431–439 up-sample the outputs Y1", U1" and V1", Y2", U2" and V2" and Y3", U3" and V3" from the video dividers 421–423, respectively, to increase the data amount thereof. Then, the low pass filters 441–449 remove the high frequency components from the outputs V431–V439 from the up-sampler elements 431–439, respectively, to limit frequency bands thereof for prevention of a video overlapped phenomenon. As a result, the resultant video signals Y1', U1' and V1', Y2', U2' and V2' and Y3', U3' and V3' from the low pass filters 441–449 are applied to the format conversion circuit 9 in FIGS. 1 and 2.

In the format conversion circuit 9, as shown in FIG. 2, the clock detector 33 discriminates the format of the input video data in response to the output from the OR gate OR1 which inputs the clock CLK and the format select mode signal MSM. Then, the PLL 35 adjusts the phase of the oscillating frequency in response to the output V36 from the format identifier ROM 36 corresponding to the format discriminated by the clock detector 33, and outputs the phase-adjusted oscillating frequency V35 to the clock detector 33.

The synchronous signal Sync is frequency-divided by the synchronous frequency-divider 31 suitably to the HDTV format. The format controller 34 controls the scanning format converter 25, the format region converter 26 and the video divider 27 in response to the output V33 from the clock detector 33.

Upon receiving the outputs Y1', U1' and V1', Y2', U2' and V2' and Y3', U3' and V3' from the up-sampler 102, the buffers 28–30 buffer the received signals, respectively, and output the buffered signals to the video divider 27. In this case, the video divider 27 acts to synthesize the video portions divided for the recording according to the video importance. Namely, the video divider 27 converts the received video signals into the video signals Yo, Uo and Vo of the desired size (X',Y'). Then, the outputs Yo, Uo and Vo from the video divider 27 are applied to the format region converter 26 or the post-processor 11 through the switch SW10.

In the case where the outputs Yo, Uo and Vo from the video divider 27 are applied to the post-processor 11 of FIG. 9 through the switch SW10, they are processed by the format converter 46, the picture zoomer 47, the art processor 48 and the color inverter 49 under the control of the mode selector 45. Then, the synthesizer 50 synthesizes the Y components, U components and V components of the outputs Y46, U46 and V46 from the format converter 46, the outputs Y47, U47 and V47 from the picture zoomer 47, the outputs Y48, U48 and V48 from the art processor 48 and the outputs Y49, U49 and V49 from the color inverter 49 in response to the synchronous signal Sync, respectively. In result, the synthesized video outputs YP, UP and VP from the synthesizer 50 are converted into the analog video signal by the D/A converter 12 in FIG. 1 and then outputted to the standard TV monitor Monitor2.

In the case where the outputs Yo, Uo and Vo from the video divider 27 are applied to the format region converter 26 through the switch SW10, they are up-sampled by the format region converter 26 for conversion into the size (X,Y). Then, the scanning format converter 25 receives the video signals Yi, Ui and Vi of the interlaced scanning type from the format region converter 26 through the switch SW9 and converts the received video signals into the video signals Y, U and V of the progressive scanning type as shown in FIG. 3B. At this time, the format controller 34 controls the scanning format converter 25 to perform inter-field interpolation or intra-field interpolation using the scanning conversion information based on the motion vector and the displaced frame or field difference signal used in the previous encoding. Namely, the scanning format converter 25 converts the video signals Yi, Ui and Vi of the interlaced scanning type into the video signals Y, U and V of the progressive scanning type by performing the inter-field interpolation or the intra-field interpolation under the control of the format controller 34.

Subsequently, the video processor 4 receives the expanded video signals Y, U and V from the format conversion circuit 9 and restores the received video signals into the original color signals R, G and B. Then, the D/A converter 5 converts the color signals R, G and B from the video processor 4 into the analog video signal and outputs the converted analog video signal to the high definition monitor Monitor1. On the other hand, the audio signal A7 is applied to the decoder 3 through the digital audio input/output unit 7 and then to the D/A converter 6. Then, the D/A converter 6 converts the audio output from the decoder 3 into the analog audio signal and outputs the analog audio signal to the speaker SP1.

As apparent from the above description, according to the present invention, in the case where the standard TV system will coexist with the HDTV system commercially available in the near future, the digital VCR can record both the HDTV broadcasting signal and the NTSC broadcasting signal, convert the HDTV broadcasting signal into the NTSC broadcasting signal for the playback and convert the NTSC broadcasting signal into the HDTV broadcasting signal for the playback.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A television-integrated video cassette recorder apparatus comprising:

a high definition television for receiving a high definition television signal from a broadcasting station;

a digital video cassette recorder for recording and playing back the high definition television signal or a standard television signal on/from a magnetic tape, said high definition television displaying the high definition television signal; and interface means for converting a format of the high definition television signal into a recording format of said digital video cassette recorder in a recording mode, converting a format of a playback signal from said digital video cassette recorder into a high definition television format for said high definition television or a standard television format in a playback mode and performing a plurality of screen processing functions in a standard television manner.

2. A television-integrated video cassette recorder apparatus as set forth in claim 1, wherein said digital video cassette recorder includes:

encoding means for selecting one of the high definition television signal and the standard television signal and encoding the selected television signal.

3. A television-integrated video cassette recorder apparatus as set forth in claim 1, wherein said digital video cassette recorder includes:

encoding means for selecting one of the high definition television signal and the standard television signal and encoding the selected television signal; and formatting means for formatting an encoded signal from said encoding means into a recording format having a toughness against a burst error component.

4. A television-integrated video cassette recorder apparatus as set forth in claim 1, further comprising:

digital audio input/output means for inputting and outputting digital audio signals from/to said high definition television and said digital video cassette recorder; and analog audio output means for inputting an analog audio signal from said digital video signal cassette recorder and outputting the inputted analog audio signal to a speaker.

5. A television-integrated video cassette recorder apparatus as set forth in claim 1, wherein said interface means includes:

a scanning format converter for converting a scanning format of the video data from said high definition television into the recording format of said digital video cassette recorder in the recording mode under control of a synchronous frequency-divider, a clock frequency-divider and a format controller;

a format region converter for converting a size of video output data from said scanning format converter into a desired size; and a video divider for dividing video output data from said format region converter by regions according to a video importance, said scanning format converter, said format region converter and said video divider performing said operation in the reverse order in the playback mode.

6. A television-integrated video cassette recorder apparatus as set forth in claim 5, wherein said format controller controls said scanning format converter in response to an output signal from a clock detector and scanning conversion control data from a scanning format determinator to perform progressive/interlaced scanning conversion or interlaced/progressive scanning conversion with respect to the video data using inter-field interpolation or intra-field interpolation, said clock detector determining the data format in response to a clock signal and a format select mode signal, said scanning conversion control data from said scanning format determinator being determined based on a motion vector and a displaced frame or field difference signal.

7. A television-integrated video cassette recorder apparatus as set forth in claim 1, wherein said digital video cassette recorder includes: formatting means for formatting an encoded signal into the recording format of said digital video cassette recorder to have a toughness against a burst error component.

8. A television-integrated video cassette recorder apparatus as set forth in claim 7, wherein said formatting means includes:

a segment separator for separating a synchronous signal and data information from each segment of the encoded signal;

a data memory for storing the data information from said segment separator;

a header appender for appending an identifier and status information to the synchronous signal from said segment separator in the unit of segment in response to an interleaving control signal;

a demultiplexer for demultiplexing an output from said data memory in the unit of segment in response to the interleaving control signal;

a plurality of buffers for buffering the demultiplexed outputs from said demultiplexer, respectively;

a plurality of delay elements for delaying outputs from said buffers for different predetermined time periods, respectively;

a multiplexer for multiplexing outputs from said delay elements in response to the interleaving control signal;

an interleaver for interleaving an output from said multiplexer into a new format in response to the interleaving control signal; and a segment reformatter for formatting an output from said header appender and an output from said interleaver into the recording format having the toughness against the burst error component.

9. A television-integrated video cassette recorder apparatus as set forth in claim 1, wherein said digital video cassette recorder includes:

a scrambler for scrambling a video signal of the high definition television signal or a video signal of the standard television signal to make a data size uniform;

a discrete cosine transform unit for performing a discrete cosine transform operation with respect to an output from said scrambler;

an activity calculator for calculating an activity of an output from said discrete cosine transform unit;

a control parameter calculator for calculating a control parameter in response to an output from said activity calculator; and a control parameter initializer being initialized in response to the calculated control parameter from said control parameter calculator.

10. A television-integrated video cassette recorder apparatus as set forth in claim 9, further comprising:

a delay element for delaying the output from said discrete cosine transform unit for a predetermined time period;

a data selector for selecting an output from said delay element under control of said control parameter initializer if a control output of said control parameter initializer is greater than a predetermined level;

a human visual system unit for multiplying an output from said data selector by a weight function under the control of said control parameter initializer;

a quantizer for quantizing an output from said human visual system unit under the control of said control parameter initializer;

a variable length coder for performing variable length coding with respect to an output from said quantizer in response to information from a field based variable length code table, information from a frame based variable length code table and the scanning conversion information;

a buffer for buffering a coded bit stream from said variable length coder; and a coding controller for checking an output rate of said buffer and controlling said data selector and said quantizer in accordance with the checked result.

11. A television-integrated video cassette recorder apparatus as set forth in claim 1, wherein said interface means includes:

formal conversion means for discriminating a format of video data from said high definition television or said digital video cassette recorder, performing scanning formal conversion and size conversion with respect to the video data in accordance with the discriminated result and dividing the video data by regions or synthesizing the divided video data.

12. A television-integrated video cassette recorder apparatus as set forth in claim 11, further comprising:

post-processing means for processing video outputs from said format conversion means to perform the plurality of screen processing functions in the standard television manner and outputting the processed video data to digital/analog conversion means; and sampling means for sub-sampling the video outputs from said format conversion means and up-sampling the video data from said digital video cassette recorder.

13. A television-integrated video cassette recorder apparatus as set forth in claim 12, wherein said post-processing means includes:

a format converter for converting a format of the video outputs from said format conversion means into the standard television format under control of a mode selector;

a picture zoomer for adjusting a size of a video to be displayed on a screen of a standard television monitor;

an art processor for performing a video edit function; and a color inverter for performing a color inverting function.

14. A television-integrated video cassette recorder apparatus as set forth in claim 11, wherein said interface means includes:

a sub-sampler for sub-sampling the video outputs from said format conversion means; and an up-sampler for up-sampling the video data from said digital video cassette recorder.

15. A television-integrated video cassette recorder apparatus as set forth in claim 14, wherein said sub-sampler includes:

a plurality of low pass filters for removing high frequency components from the video outputs from said format conversion means to limit frequency bands thereof, respectively;

a plurality of sub-sampler elements for sub-sampling outputs from said low pass filters, respectively; and a plurality of video synthesizers for synthesizing Y components, U components and V components of outputs from said sub-sampler elements, respectively.

16. A television-integrated video cassette recorder apparatus as set forth in claim 14, wherein said up-sampler includes:

a plurality of video dividers for dividing the video data from said digital video cassette recorder, respectively;

a plurality of up-sampler elements for up-sampling outputs from said video dividers, respectively; and a plurality of low pass filters for removing high frequency components from outputs from said up-sampler elements to limit frequency bands thereof, respectively.

17. A television-integrated video cassette recorder apparatus comprising:

a high definition television for receiving a high definition television signal from a broadcasting station;

a digital video cassette recorder for recording and playing back the high definition television signal or a standard television signal on/from a magnetic tape, said digital video cassette recorder including:

formatting means for dividing a video signal of the high definition television signal or a video signal of the standard television signal into odd and even field data and converting a data format according to scanning conversion information, and coding means for scrambling output data from said formatting means and coding the scrambled data suitably to a video characteristic; and interface means for converting a format of the high definition television signal into a recording format of said digital video cassette recorder in a recording mode, and converting a format of a playback signal from said digital video cassette recorder into a high definition television format or a standard television format in a playback mode.

18. A television-integrated video cassette recorder apparatus as set forth in claim 17, wherein said interface means includes:

format conversion means for discriminating a format of video data from said high definition television or said digital video cassette recorder, performing scanning format conversion and size conversion with respect to the video data in accordance with the discriminated result and dividing the video data by regions or synthesizing the divided video data;

post-processing means for processing video outputs from said format conversion means to perform a plurality of screen processing functions in a standard television manner; and sampling means for sub-sampling the video outputs from said format conversion means and up-sampling the video data from said digital video cassette recorder.

19. A television-integrated video cassette recorder apparatus as set forth in claim 17, wherein said coding means includes:

a scrambler for scrambling the video signal of the high definition television signal or the video signal of the standard television signal to make a data size uniform;

a discrete cosine transform unit for performing a discrete cosine transform operation with respect to an output from said scrambler;

an activity calculator for calculating an activity of an output from said discrete cosine transform unit;

a control parameter calculator for calculating a control parameter in response to an output from said activity calculator; and a control parameter initializer being initialized in response to the calculated control parameter from said control parameter calculator.

20. A television-integrated video cassette recorder apparatus as set forth in claim 19, further comprising:

a delay element for delaying the output from said discrete cosine transform unit for a predetermined time period;

a data selector for selecting an output from said delay element under control of said control parameter initializer if a control output of said initializer is greater than a predetermined level;

a human visual system unit for multiplying an output from said data selector by a weight function under the control of said control parameter initializer;

a quantizer for quantizing an output from said human visual system unit under the control of said control parameter initializer;

a variable length coder for performing variable length coding with respect to an output from said quantizer in response to information from a field based variable length code table, information from a frame based variable length code table and the scanning conversion information;

a buffer for buffering a coded bit stream from said variable length coder; and a coding controller for checking an output rate of said buffer and controlling said data selector and said quantizer in accordance with the checked result.

21. A television-integrated video cassette recorder apparatus comprising:

a high definition television for receiving a high definition television signal from a broadcasting station;

a digital video cassette recorder for recording and playing back the high definition television signal or a standard television signal on/from a magnetic tape; and interface means for converting a format of the high definition television signal into a recording format of said digital video cassette recorder in a recording mode, converting a format of a playback signal from said digital video cassette recorder into a high definition television format or a standard television format in a playback mode and performing a plurality of screen processing functions in a standard television manner, wherein said interface means includes, format conversion means for discriminating a format of video data from said high definition television or said digital video cassette recorder, performing scanning format conversion and size conversion with respect to the video data in accordance with the discriminated result and dividing the video data by regions or synthesizing the divided video data, post-processing means for processing video outputs from said format conversion means to perform the plurality of screen processing functions in the standard television manner and outputting the processed video data to a digital/analog conversion circuit, sampling means for sub-sampling the video outputs from said format conversion means and up-sampling the video data from said digital video cassette recorder, digital audio input/output means for inputting and outputting digital audio signals from/to said high definition television and said digital video cassette recorder, and analog audio output means for inputting an analog audio signal from said digital video cassette recorder and outputting the inputted analog audio signal to a speaker.

* * * * *